Sept. 25, 1934.  M. VLOCH  1,974,936
HOLDER FOR AN X-RAY FILM PACKET
Filed Dec. 29, 1933
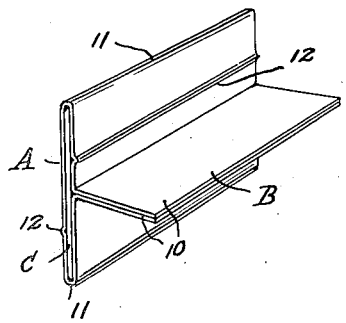
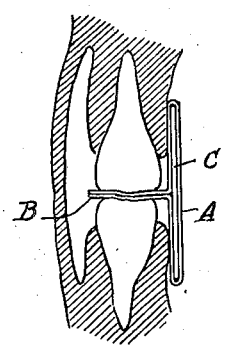
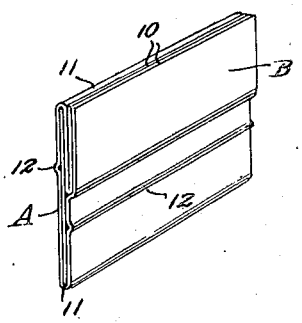
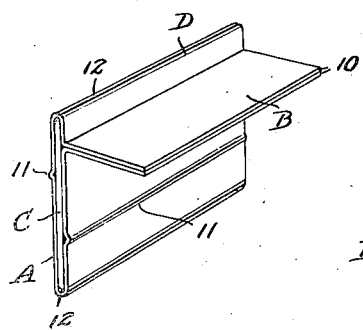
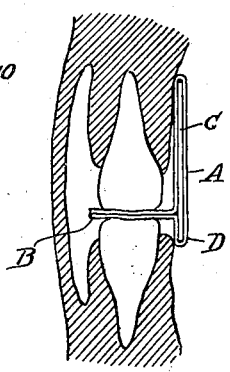
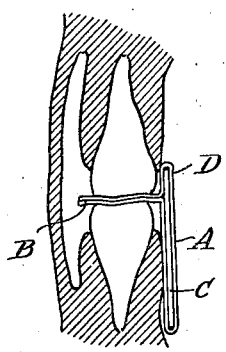
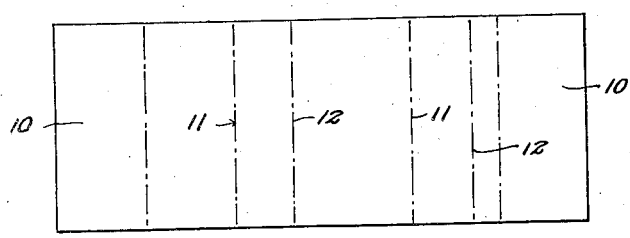
INVENTOR.
MARK VLOCH
BY Clark & Ott
ATTORNEYS.

Patented Sept. 25, 1934

1,974,936

UNITED STATES PATENT OFFICE 1,974,936

HOLDER FOR AN X-RAY FILM PACKET

Mark Vloch, Bronx, N. Y.

Application December 29, 1933, Serial No. 704,433

5 Claims. (Cl. 250—34)

This invention relates to X-ray film packets employed by dentists, either for interproximal examinations for caries or decay, or for apical radiography of the upper or maxillary teeth and lower or mandibular teeth, and the invention has more particular reference to an improved holder by virtue of which film packets for the various purposes enumerated may be properly supported within the mouth for exposure.

Heretofore, in apical radiography it has been the general practice to have the patient hold the film packet in position with the finger during exposure, while in interproximal examinations, the film packet has been especially constructed to provide as a part thereof, a wing which is gripped between the teeth to hold the same in position.

The invention broadly comprehends, as an article separate from the film packet, a holder which is adapted to receive an X-ray film packet and which holder includes means to be gripped between the teeth so as to retain the packet in juxtaposition to the teeth during the exposure of the film.

The invention further provides a holder which is constructed in such a manner that it may be optionally adjusted to receive and support a film packet in proper position with reference to one or more of the teeth for the various purposes set forth.

The invention further resides in the provision of a holder of the indicated character which is extremely simple in its construction and mode of use, inexpensive to produce, and which is highly efficient for its intended purpose.

With the above recited and other objects in view, reference is now made to the following specification and accompanying drawing in which there is disclosed a preferred embodiment of the invention, while the claims cover variations and modifications thereof which fall within their scope.

In the drawing:

Fig. 1 is a perspective view of a holder constructed in accordance with the invention, with the film packet arranged therein and showing the holder adjusted to adapt the same for supporting the film packet for interproximal examinations of both the upper and lower teeth simultaneously within a given region.

Fig. 2 is a diagrammatic view illustrating the manner in which the holder, containing a firm packet, is held in position in the mouth for interproximal examination of the upper and lower teeth.

Fig. 3 is a perspective view of the holder with the film packet therein and with the holder adjusted and arranged to support the film packet for apical radiography.

Fig. 4 is a diagrammatic view illustrating this use of the holder for apical radiography of the upper or maxillary teeth.

Fig. 5 is a similar view illustrating the holder in position for apical radiography of the lower or mandibular teeth.

Fig. 6 is a perspective view illustrating the manner in which the tab or fin is folded at its juncture with the body to lie in a plane parallel thereto so that a number of the holders may be compactly nested together.

Fig. 7 is a view of a blank from which the holder is formed.

Referring to the drawing by characters of reference, the holder is preferably constructed of a strip or elongated sheet of inexpensive radio-lucent material such as paper, rubber, "cellophane" or any other equivalent stock. The blank, as shown in Fig. 7, has the opposite ends 10—10 thereof secured together either adhesively or otherwise, and between said ends pairs of longitudinally spaced, transversely extending score lines 11—11 and 12—12 are provided so that the portion of the strip between said ends may be folded into a flat loop or sheath-like body A, while the ends 10—10 define a tab or fin B. When the holder is not in use, the tab or fin B may be folded at its juncture with the flat loop or sheath-like body A to lie in a plane parallel to the body, as shown in Fig. 6, whereby a number of the holders may be compactly nested together in order to occupy a minimum amount of space.

When in use, the tab or fin B is disposed at an angle with the body A and the film packet C is telescopically fitted within the loop or sheath-like body, while the tab or fin B serves as a means which is gripped between the teeth for retaining the body and film packet in juxtaposition to the teeth or tooth to be X-rayed.

In use of the holder for simultaneous interproximal examination of the upper and lower teeth, the loop or sheath-like body is formed by folding the strip on the pair of score lines 11—11 which disposes the tab or fin B centrally of the body so that equal portions of the film packet and said body protrude above and below the tab or fin B thus exposing the film within the film packet to the rays passing through, parallel to the proximal surfaces of both the upper and lower or maxillary or mandibular teeth as shown in Fig. 2.

When the holder is to be employed for apical radiography of either one or more of the upper or lower teeth, the strip is folded on the pair of score lines 12—12 thus disposing the tab or fin B in closer proximity to one edge of the loop or sheath than the other whereby the major portion of the film protrudes either above or below the tab or fin B so as to expose the film to the rays passing through substantially the entire height of either one or more of the upper teeth or one or more of the lower teeth at the option of the dentist. In this instance it will be observed that the minor protruding portion indicated at D serves in the capacity of an abutment which engages with the teeth or gums to hold the body A and the film packet C contained therein, in a fixed position against accidental or unintentional movement during exposure.

What is claimed is:

1. A holder for intra-oral X-ray film packets fashioned from a strip of radio-lucent material having the ends thereof secured together to provide an angularly disposed tab portion adapted to be gripped between the teeth and a packet encompassing portion having pairs of score lines which pairs are optionally used so as to locate the tab portion at a plurality of different distances from an edge of a film packet arranged in said encompassing portion.

2. A holder for an intra-oral X-ray film packet including a flat open ended loop-like body formed from a sheet of radio-lucent material and adapted to receive the film packet and a tab formed integral with the body adapted to be gripped between the teeth, said body having a plurality of pairs of score lines perpendicular to the open ends of the body and upon which pairs the body is selectively folded to dispose the tab at relatively different distances from a side edge of the body.

3. A holder for an intra-oral X-ray film packet comprising a flat open ended loop and a tab flexibly connected to said loop to protrude therefrom in a plane at an angle to the plane of the loop and extending in a direction at an angle to the open ends of the loop, said loop having a plurality of pairs of fold lines extending in a direction perpendicular to the open ends thereof and so located as to permit of the selective disposal of the tab at a plurality of relatively different distances from a marginal edge of the loop.

4. A holder for intra-oral X-ray film packets including a strip of radio-lucent material, terminal portions of said strip being secured together to provide a tab and the remaining intermediate portion having a plurality of pairs of transverse score lines which permit of the optional folding of the said intermediate portion on either of said pairs of score lines so as to define a flat open-ended loop for freely receiving and encompassing a film packet insertable through an open end thereof and to selectively locate the tab in either of a plurality of positions at different distances from an edge of a film packet arranged within said loop.

5. A holder for intra-oral X-ray film packets including a loop-like body adapted to freely receive and encompass a film packet insertable therein through one of its open ends, and an external tab carried by and extending axially of the body, said body having a plurality of pairs of score lines extending axially thereof from one open end to the other and on which pairs of score lines the body may be optionally folded to selectively locate the tab at different distances from one edge of a film packet arranged therein.

MARK VLOCH.